J. L. LARRAD.
LOCK NUT.
APPLICATION FILED DEC. 31, 1910.

1,025,702.

Patented May 7, 1912.

UNITED STATES PATENT OFFICE.

JOHN LEWIS LARRAD, OF BEXHILL, ENGLAND.

LOCK-NUT.

1,025,702.  Specification of Letters Patent.  Patented May 7, 1912.

Application filed December 31, 1910. Serial No. 600,288.

*To all whom it may concern:*

Be it known that I, JOHN LEWIS LARRAD, a subject of the King of England, residing at Bexhill-on-Sea, Sussex, England, have invented certain new and useful Improvements in Lock-Nuts, of which the following is a specification.

This invention relates to the locking of nuts upon their screws and comprises a primary nut which operates as an ordinary nut to take the strain and a lock-nut of particular construction to engage with the primary nut.

Figure 1:
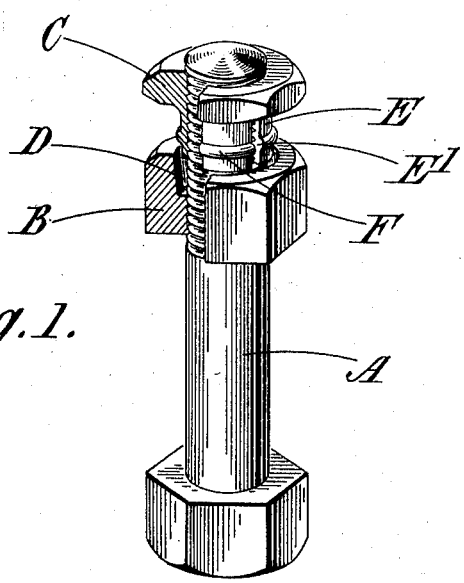
Figure 2:
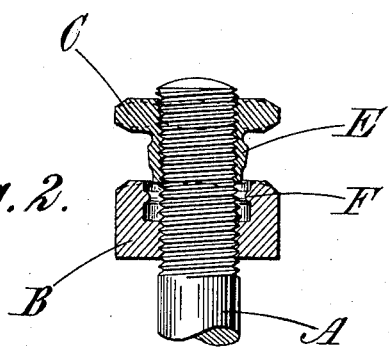

The invention will be best understood by reference to the accompanying drawings in which:

Figure 1 is a view of a bolt with the two nuts partly in section upon it; Fig. 2 shows a modification.

Like letters represent like parts in both figures.

A is the bolt, B the primary nut and C the lock-nut. The bolt A is of usual construction and needs no description. The nut B has a slightly conical recess D into which the split extension or sleeve E of the nut C enters. The sleeve E is split longitudinally, as at E', in preferably four places, so that the portions or tongues of the collar can be compressed upon the bolt. The nut C and sleeve E are screw threaded throughout their length, and screw on to the bolt, as shown, the split portion of E having a raised collar or peripheral rim F, which when the lock-nut is screwed into the primary nut engages with the tapered recess D and compresses the tongues of E so as to secure a firm grip by the latter upon the bolt. The rim F should be placed between the ends of the sleeve E, the best position being centrally between the ends so as to insure the tongues being pressed equally upon the bolt and not merely at their outer ends. This enlargement F is an important feature of the invention, since while insuring the grip of the lock-nut upon the bolt when the two nuts approach each other, it does not engage so strongly with the wall of the conical recess D as to prevent relative movement of the two nuts. The result of this is that should the primary nut slack back owing to vibration or other causes, it will turn upon the lock-nut, though the lock-nut will not turn upon the bolt and consequently any tendency of the primary nut to slack back insures a firmer grip of the lock-nut upon the bolt and consequently still further prevents the lock-nut from slacking back.

The arrangement in Fig. 2 is the same as that of Fig. 1, excepting that the collar F instead of being upon the outside of the split sleeve E is upon the inside of the recess D E being consequently coned instead of the recess D. The outside diameter of the end of E is a little less than the internal diameter of F, so that these parts may not engage until about the longitudinal center of the sleeve as above explained. The operation is exactly the same as first described. Should the screwed portion of the nut B not be long enough for the required strain, the nut may be lengthened, or what amounts to the same thing, the recess D may be formed in a projecting sleeve or extension upon the outer end of the nut.

In using the invention, the nut B is first screwed down upon the bolt, stud, etc., to fix the work; then the lock-nut is also screwed down, its raised collar F compressing the tongues of the split sleeve E tightly upon the bolt, whereby the efficient locking of both nuts is effected.

I wish it to be understood that the collar F is essential to the efficient working of this invention and that the mere tapering of the sleeve E to match the taper of the conical recess D would not be an efficient carrying out of the invention, for the simple reason that with such an arrangement the nuts would hold to each other more tightly than either of them would hold to the bolt and consequently vibration would be likely to cause both the nuts to unscrew.

What I claim as my invention and desire to secure by Letters Patent is:—

1. A nut lock comprising a nut having a recess, a lock nut having a split sleeve extension, and a rib on said extension adapted to engage the wall of the recess between the ends of said recess one of said parts having a longitudinal taper to effect the compression of the sleeve when screwed into the recess of the nut; substantially as described.

2. A nut lock comprising a nut having a recess, a lock nut having a split sleeve extension, and a rib projecting from the wall of said recess to engage the extension between the end of said extension and its junction with the lock nut, one of said parts having a longitudinal taper to effect the compression of the sleeve when screwed into the recess of the nut; substantially as described.

3. A nut lock comprising a threaded nut, a screw arranged to receive said nut, said nut having a tapered recess in its outer face, a lock nut having a split sleeve extension arranged to enter said recess, and a rib on said extension arranged to engage the tapered wall of the recess, the frictional engagement between the rib and the wall of the recess being less than the frictional engagement between the lock nut and the screw; substantially as described.

In testimony whereof I have signed my name to this specification in the presence of two subscribing witnesses.

JOHN LEWIS LARRAD.

Witnesses:
H. D. JAMESON,
R. WILSON.

Copies of this patent may be obtained for five cents each, by addressing the "Commissioner of Patents, Washington, D. C."